United States Patent
Blakely

(10) Patent No.: US 8,781,508 B1
(45) Date of Patent: Jul. 15, 2014

(54) SYSTEM AND METHOD FOR TRANSFERRING INFORMATION BETWEEN A REMOTE COMPUTING DEVICE AND A CENTRAL BUSINESS UNIT

(75) Inventor: John Ford Blakely, Del Mar, CA (US)

(73) Assignee: Brytelight Enterprises, Del Mar, CA (US)

( * ) Notice: Subject to any disclaimer, the term of this patent is extended or adjusted under 35 U.S.C. 154(b) by 688 days.

(21) Appl. No.: 12/624,211

(22) Filed: Nov. 23, 2009

Related U.S. Application Data

(60) Provisional application No. 61/117,801, filed on Nov. 25, 2008, provisional application No. 61/158,681, filed on Mar. 9, 2009.

(51) Int. Cl.
*H04W 4/00* (2009.01)

(52) U.S. Cl.
USPC ............... 455/466; 455/412.2; 455/414.1; 455/419; 455/420

(58) Field of Classification Search
USPC ............ 455/466, 412.1–414.4, 418–420; 705/15, 26.1–27.2
See application file for complete search history.

(56) References Cited

U.S. PATENT DOCUMENTS

| | | | | | |
|---|---|---|---|---|---|
| 4,380,009 | A | * | 4/1983 | Long et al. | 340/7.2 |
| 4,437,184 | A | * | 3/1984 | Cork et al. | 714/38.14 |
| 4,903,232 | A | * | 2/1990 | O'Connell et al. | 358/1.1 |
| 5,373,282 | A | * | 12/1994 | Carter | 340/5.3 |
| 5,542,487 | A | * | 8/1996 | Schultz et al. | 178/4.1 A |
| 8,229,404 | B2 | * | 7/2012 | Sweeney et al. | 455/414.1 |
| 2002/0143655 | A1 | * | 10/2002 | Elston et al. | 705/26 |
| 2004/0203772 | A1 | * | 10/2004 | Galetti | 455/435.1 |
| 2005/0277429 | A1 | * | 12/2005 | Laroia et al. | 455/458 |
| 2007/0207814 | A1 | * | 9/2007 | Usuda et al. | 455/455 |
| 2008/0059279 | A1 | * | 3/2008 | Goldschneider et al. | 705/10 |
| 2009/0125340 | A1 | * | 5/2009 | Gosney | 705/5 |
| 2011/0035250 | A1 | * | 2/2011 | Finucan | 705/9 |
| 2013/0217365 | A1 | * | 8/2013 | Ramnani | 455/414.1 |

* cited by examiner

*Primary Examiner* — Sharad Rampuria

(74) *Attorney, Agent, or Firm* — Cooley LLP

(57) ABSTRACT

Systems and methods for receiving, processing and responding to text messages are described. In one embodiment a central business unit (CBU) response system may include apparatus for receiving text messages from a message sender, storing the messages in a memory, providing a user indication of receipt of the text messages, displaying and/or printing the message contents, receiving a user input in response to the user indication, and providing a confirmation message to the message sender.

23 Claims, 21 Drawing Sheets

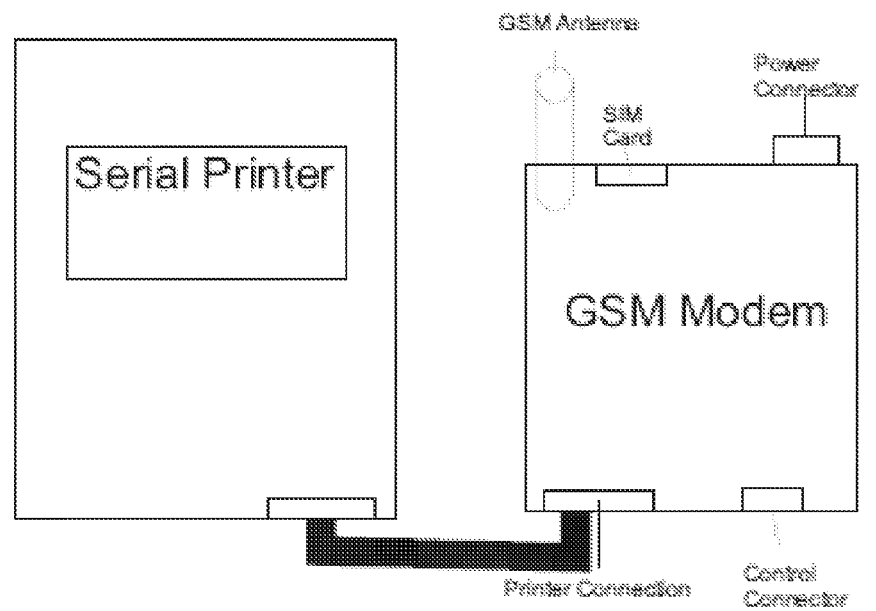
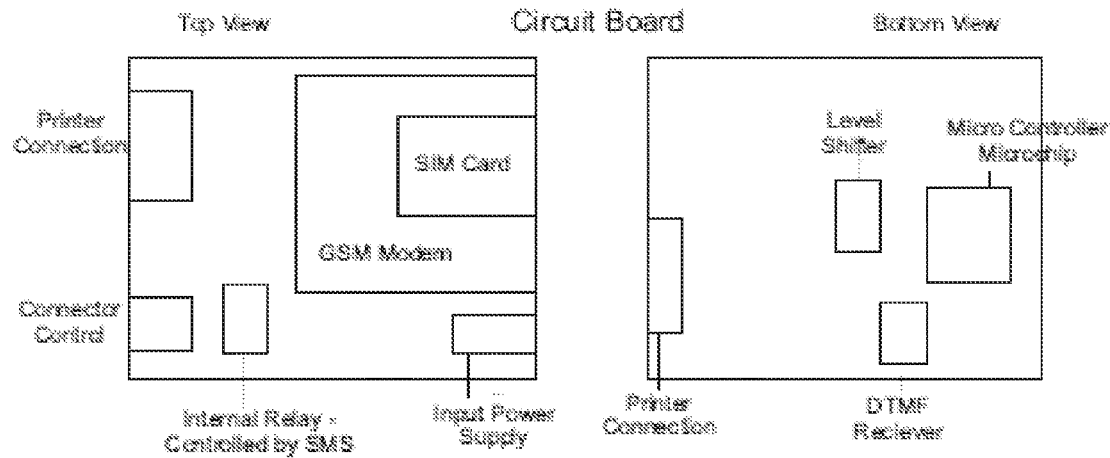
FIG. 1

| Date | Time | Phone Number | Customer | Payment Type | Payment Number | Text Message/Order | Status |
|---|---|---|---|---|---|---|---|
| 2/5 | 8:42am | 770-677-8993 | Rick Stevens | MasterCard | XXXXXXX5076 | Large mocha latte, half powder, soy milk. | Cleared |
| 2/5 | 8:43am | 404-455-7862 | Dave Johnson | Prepaid Card | XXXXXXX4493 | Medium banana smoothie. | Cleared |
| 2/5 | 8:58am | 404-521-4598 | Betsy Ellison | Visa | XXXXXXX2256 | Large decaf, vanilla blend, two sugars. | Pending |

FIG. 2

1. You sign up for Text Message Ordering service.

2. We send a unit to your store and assign you a ten digit text message ordering number...simply plug it in and it's ready to go.

3. You customize the unit we send you, from the convenience of your cell phone (auto or manual mode, response message, name, etc.)

4. You provide your text message ordering phone number to your customers (via in-store signage, bag stuffer brochures, or other methods...we have a variety of marketing collateral you can choose from and customize with your logo and business name.

5. You start receiving text message orders and seeing your customers order from you more frequently. Provide special offers and discounts inside the confirmation text message sent to your customers when they send you text orders, and see great results from marketing campaigns.

FIG. 12B

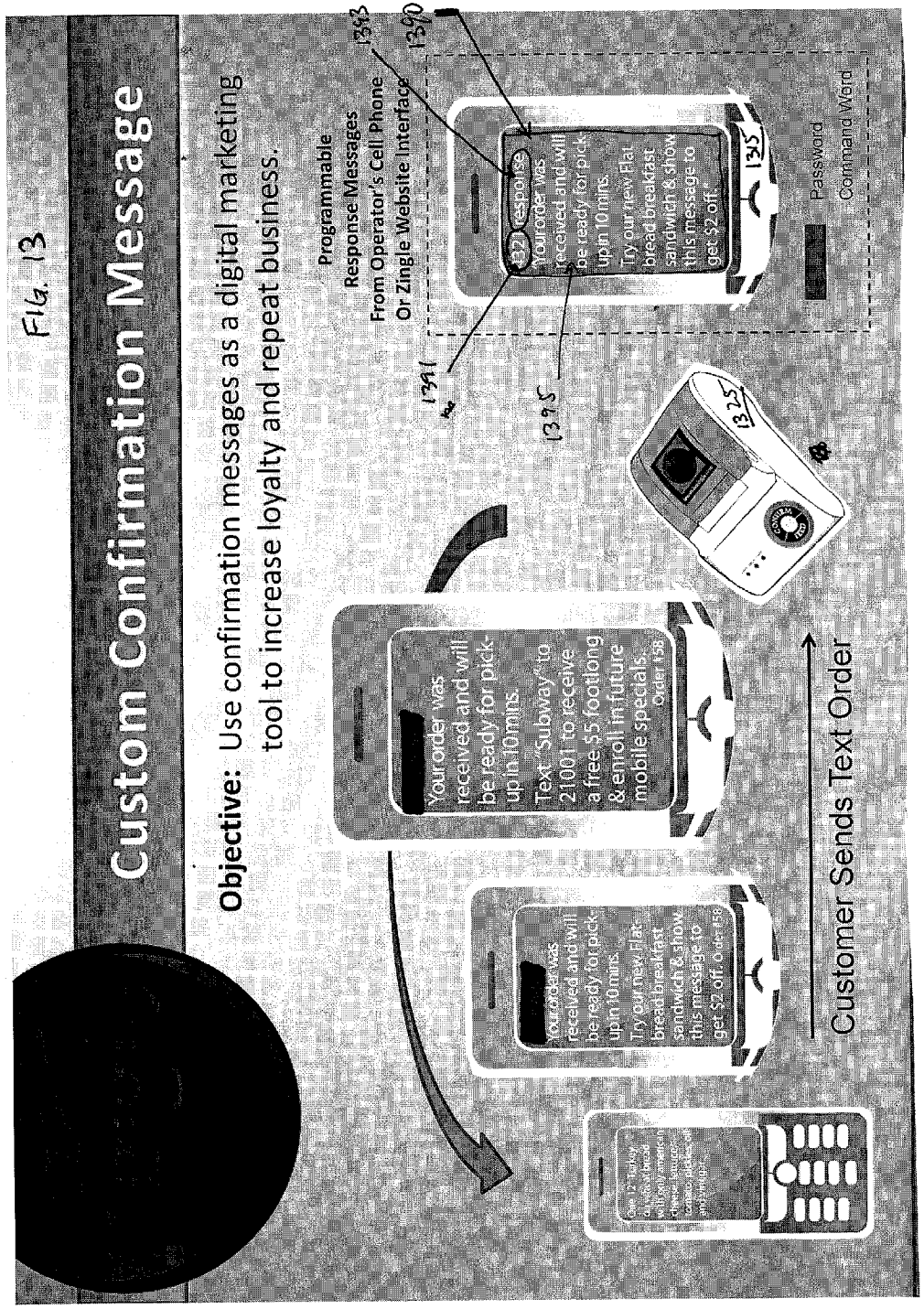

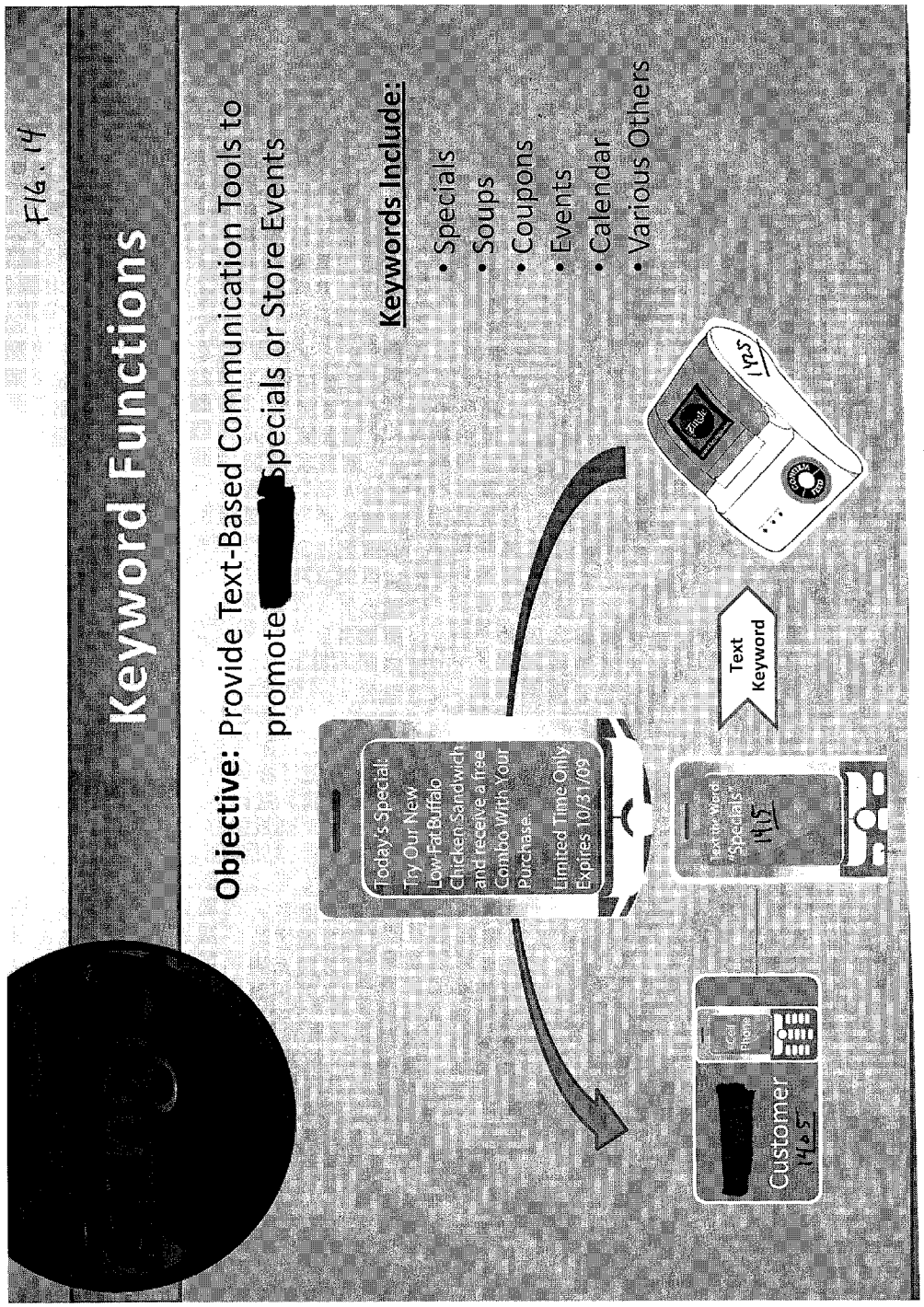

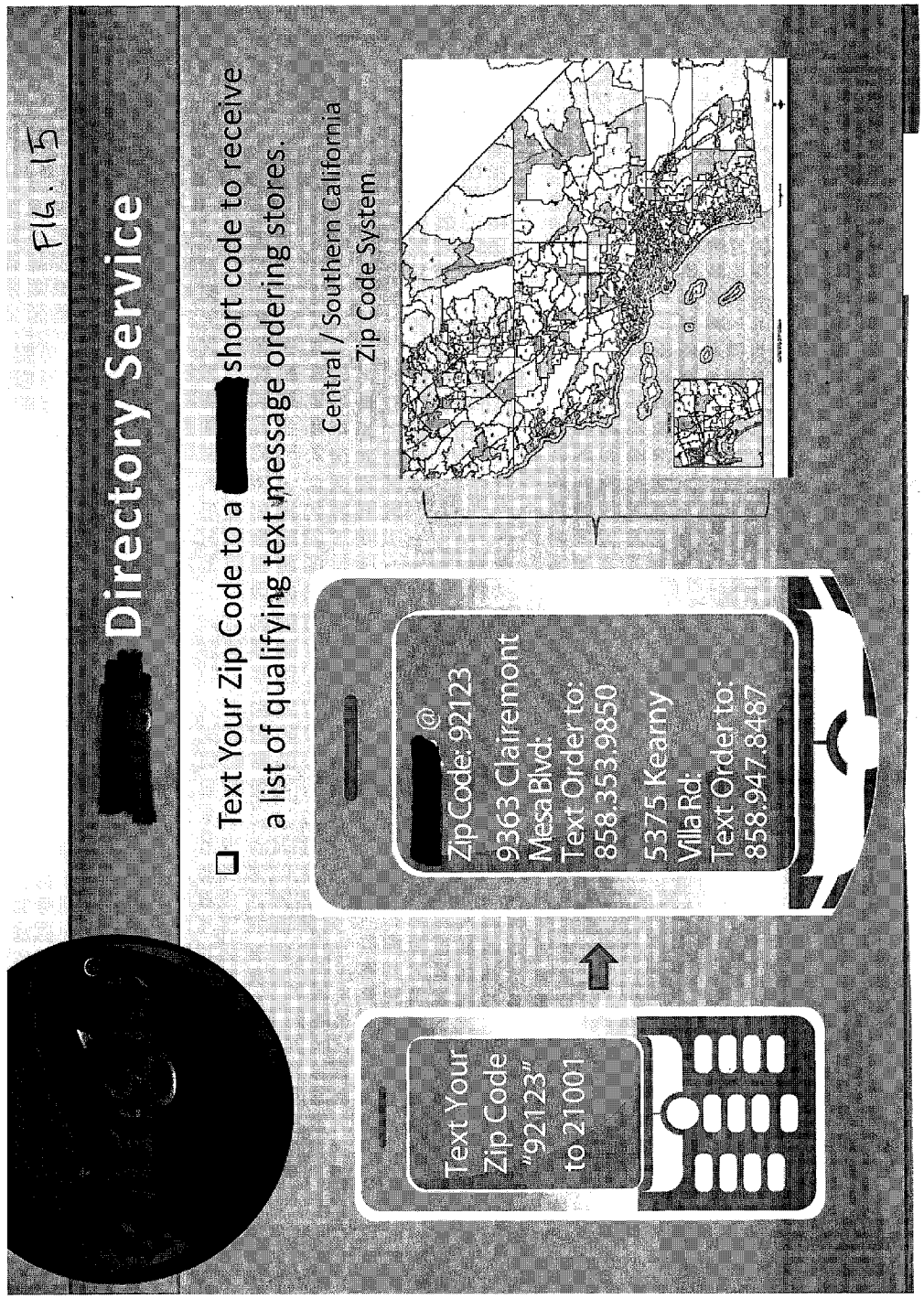

SYSTEM AND METHOD FOR TRANSFERRING INFORMATION BETWEEN A REMOTE COMPUTING DEVICE AND A CENTRAL BUSINESS UNIT

CROSS-REFERENCE TO RELATED APPLICATIONS

This application claims priority under 35 U.S.C. §119(e) to U.S. Provisional Patent Application Ser. No. 61/158,681, entitled A SYSTEM AND METHOD FOR USING SMS MESSAGES TO TRANSMIT INFORMATION BETWEEN A HANDHELD DEVICE AND A CENTRAL BUSINESS UNIT, filed on Mar. 9, 2009, the content of which is hereby incorporated by reference herein in its entirety for all purposes.

This application also claims priority under 35 U.S.C. §119 (e) to U.S. Provisional Patent Application Ser. No. 61/117,801, entitled A SYSTEM AND METHOD FOR USING SMS MESSAGES TO TRANSMIT INFORMATION BETWEEN A HANDHELD DEVICE AND A CENTRAL BUSINESS UNIT, filed on Nov. 25, 2008, the content of which is hereby incorporated by reference herein in its entirety for all purposes.

BACKGROUND

Businesses and customers transact using convention methods, including face-to-face contact. Such face-to-face transactions require a time investment that many consumers would like to reduce. With the advent of the Internet, business and customer have begun to perform portions of their transactions online. However, such transactions are hampered by the mobility of computing equipment capable of connecting to the Internet. Too often, a customer wishes to transact with a business at times when that customer is away from such a computing device that can connect to the Internet. At these times, the customer must resort to the old-fashioned face-to-face contact, where the full transaction takes place. In addition, mobile Internet connections are not always reliable, further limiting a customer's ability to transact via the Web. Accordingly, it would be desirable to enables a customer to perform at least a portion of a business transaction without having to connect to the Internet.

SUMMARY OF THE INVENTION

Exemplary embodiments of the invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the present invention.

In one aspect, the invention relates to a system and method for transferring information, via SMS (Short Messaging Service) and/or email, between a handheld device and a central business unit. The inventive systems and methods include certain embodiments that involve the use of a small GSM (Global Systems Communication) modem programmed to receive SMS messages and/or email that relays messages to a printing device. A small thermal paper printing device and a circuit board used to transfer data from the GSM/GPRS modem to the printing device are also included. The components of these embodiments form a central business unit that is designed such that SMS messages and/or are received by the business unit, recorded in memory and printed in paper format or displayed on a computer screen. Certain of these embodiments include an activation unit that, when activated (e.g., selected, pushed) by an agent of a business, alerts the user of the handheld device that the SMS message and/or email was received at the central business unit.

Certain embodiments pertain to systems and methods involving a central business unit that is designed to work in businesses (or other organizations and groups) where there is a value-added benefit of receiving information before a customer, affiliate or user becomes physically present at that business. Types of business include, but are not limited to, service businesses such as businesses associated with food service, logistic communications, sporting events, outdoor activities, valet parking, real estate/property management and other general service-based businesses.

Certain embodiments pertain to systems and methods involving a central server, operating at least in part using software, that is capable of receiving electronic information (e.g., an order for goods, a request, a notification) from a computing device (e.g., a handheld device, a personal computer) operated by a user (e.g., a customer), and passing along at least a portion of that electronic information to a computing device (e.g., central business unit, computer, handheld device) operated by a business entity (e.g., an employee, an employer, a manager). In some embodiments, the central server stores information (e.g., user profile, payment information, favorites) about the user of the computing device.

Certain embodiments pertain to systems and methods involving a central server, operating at least in part using software, that is capable of sending electronic information (e.g., a list of services, a menu, a list of locations, coupons) to a computing device (e.g., a handheld device, a personal computer) operated by a user (e.g., a customer). The central server may send that electronic information after receiving a request from the computing device for that information, or in response to a different type of transaction between the user and a business entity (e.g., an order for goods, a request, a notification) or in response to other criteria (e.g., the recognized location of the user's device using location-based recognition techniques known in the art).

Certain embodiments pertain to systems and methods involving a central server, operating at least in part using software, that is capable of receiving electronic information (e.g., a list of services, a menu, a list of locations, coupons) from a computing device (e.g., a handheld device, a computer) operated by a business entity (e.g., an employee, an employer, a manager). The central server may use that electronic information to update similar information stored in a database on behalf of that business entity. The central server may also present all or a portion of that information to a user (e.g., a customer) of another computing device (e.g., a handheld device, a personal computer).

Certain embodiments pertain to systems and methods involving a programmable central business unit. In some embodiments, a business entity (e.g., an employee, an employer, a manager) operates a computing device (e.g., a handheld device, computer) to send programming instructions to the central business unit via a communication pathway (e.g., wireless telephone network including a browser and/or SMS messages and/or voice-recognition commands, wired and wireless Internet networks including a Web portal, other communication pathways capable of transmitting signals usable for programming a computing device). The programming instructions include instructions that define various aspects of the central business unit's operation. In one instance, the instructions may dictate how a printer prints a message. In another instance, the instruction s may dictate whether and/or how the central business unit acknowledges the receipt of electronic information from a remote device (e.g., a customer operating a handheld device or personal computer). In certain embodiments, systems and methods are enabled and controlled using a specific programming language, such as Python and/or other application based programming languages.

Certain embodiments pertain to collection of data and data mining. In some embodiments, information is collected on a per transaction basis. Such information may be stored with reference to a phone number, IP address, central business unit location, user device location, time of day, and other reference information useful for various statistical operations.

BRIEF DESCRIPTION OF THE DRAWINGS

Various objects and advantages and a more complete understanding of the invention are apparent and more readily appreciated by reference to the following Detailed Description and to the appended claims when taken in conjunction with the accompanying Drawings wherein:

FIG. 1 shows a block diagram depicting a network system for receiving information from a handset in accordance with at least one embodiment of the invention;

FIG. 2 illustrates a user interface for displaying information in accordance with at least one embodiment of the invention;

FIGS. 12A-B each illustrate a method in accordance with aspects of the present invention; and FIGS. 13-17 each illustrate a method in accordance with aspects of the present inventions

DETAILED DESCRIPTION OF EMBODIMENTS OF THE INVENTION

Aspects of the present invention are designed to operate on or be implemented on computer systems, servers, and/or other like devices. These embodiments may include hardware, software and/or hardware software combinations to implement the functionality and modules described herein. While the details of the embodiments of the invention may vary and still be within the scope of the invention, FIG. 1 shows a block diagram depicting a typical network system for receiving information via an SMS message or other electronic message (e.g., sent using the Internet) from a handheld device, cell phone, PDA or other computing unit, and then passing at least a portion of the received information to a printer (or other component for displaying the portion of information). The network system is only one example of a suitable computing environment and is not intended to suggest any limitation as to the scope of use or functionality of the invention. Neither should the network system be interpreted as having any dependency or requirement relating to any one or combination of components illustrated in the exemplary network system.

The network system may take various configurations within the scope and spirit of the invention. For example, the network system may be configured to include a GSM modem, a SIM card and SIM card holder/adapter, a circuit board with communication channels and power channels, a printer, an AC power supply, a panel for displaying information (e.g., LCD screen) and an connection enabling communication using the Internet. For example, FIG. 2 illustrates a user interface for displaying information.

Figure 3:
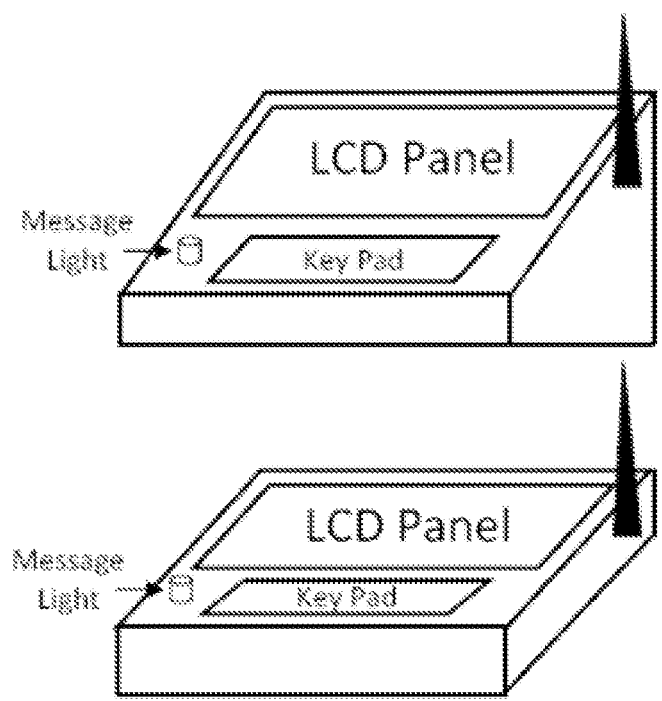
FIG. 3 illustrates a display configuration for a central business unit in accordance with at least one embodiment of the invention.

The network system may also include a notification component or output indicator element (e.g., a light, audio speaking, data signal, video display and the like) that notifies an employee or an ordering system of the business that an incoming text message has been received. FIG. 3 illustrates a display configuration for notifying an agent of a business entity (e.g., businesses associated with food service, logistic communications, sporting events, outdoor activities, valet parking, real estate/property management and other general service-based businesses) of an incoming message via a message light. In certain embodiments, the keypad shown in FIG. 3 includes an activation component that, when activated (e.g., selected, pushed) by an agent of a business, alerts the user of the handheld device that the SMS message and/or email was received at the central business unit.

Figure 4:
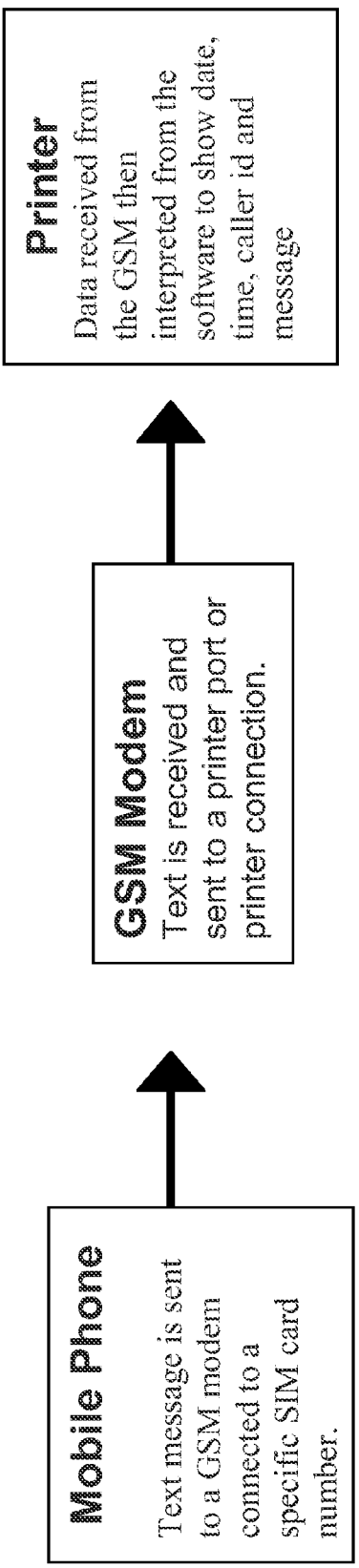
FIG. 4 illustrates a flowchart detailing a process of exchanging SMS-based information between a handheld device, a modem/server device and a printing device in accordance with at least one embodiment of the invention.

Certain embodiments of the invention relate to a system and process for transferring information from a handset to one or more components (e.g., the network system of FIG. 1) operated by a business, such as a service-oriented business. FIG. 4 illustrates a flowchart detailing the process of an exemplary embodiment of the invention. In accordance with this embodiment, a GSM modem receives an SMS message that includes electronic information (e.g., an order for goods, a request, a notification) sent from a handheld unit operated by a customer. Each GSM modem includes an integrated SIM card. After receipt, the incoming SMS message is presented to an agent of the business. For example, a portion or all of the information may be printed on a printing device (e.g., the serial printer of FIG. 1) or other audible and/or visual display device or mechanism. In the illustrated embodiment, the printing device prints the SMS message and may also add additional value-added information, such as a date and time stamp, an incoming phone number from the SMS originator, customer and profile information that is linked to the incoming phone number associated with the SMS message and/or other information. The profile information could include names, previously ordered items, other historical data, saved favorites, account numbers, prepayment records, credit card information, or other information.

Additional embodiments of the invention receive information via means of communications other than SMS-based exchange of information. For example, the information may be communicated via different communication channels such as wired and/or wireless Internet. The information may be delivered via email instead of an SMS message. Moreover, additional embodiments of the invention receive information from devices other than telephonic handheld devices. For example, such communications may originate from personal computers or other digital devices capable of electronic communication.

Also, certain embodiments allow for the exchange of information from the central business unit (or similar unit) to the handheld device (or similar device). Such information exchange enables efficient, two-way communication between the business and the user of the handheld device. One of skill in the art will appreciate alternative information exchanged between the business and the user than the examples that follow. The information passed to the handheld device can include any type of information relevant to a transaction initiated by the user and carried out by the business on behalf of servicing the customer. For example, the business may pass information related to the user's recent order (while pending or after it has been processed), including an acknowledgement of the receipt of that order or the completion of the activity requested by the customer. Alternatively, the business may pass information related to customer profile data (e.g., advertising, coupons and deal offers based on previous orders or preset preferences). The customer profile data may be stored at the business entity (e.g., within the central business unit or within a data storage unit capable of receiving the customer profile data). Alternatively, the customer profile data may be stored in a remote server (shown in FIG. 10) that stores customer profile information for any number customers that transact with any number of business entities. The remote server may also store business entity profile data (e.g., a list of services, a menu, a list of locations, coupons).

Information sent from the business to the handheld may be manually driven (e.g., initiated by an employee at the business), or may be automatic. In either arrangement, a menu may be provided to a user at the handheld device and that user may select one or more menu options in order to complete an order/transaction.

Figure 5:
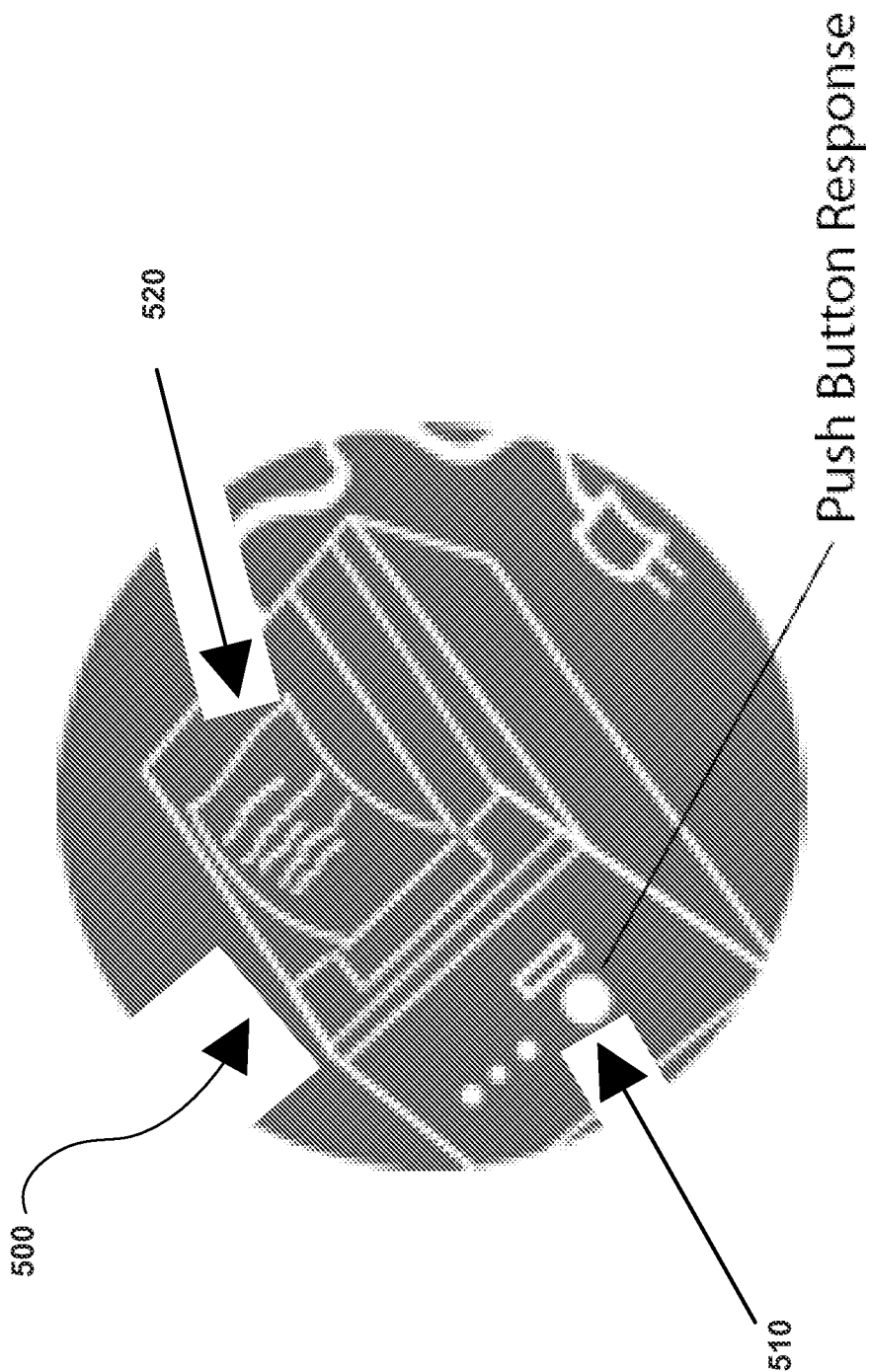
FIG. 5 illustrates a terminal configured to facilitate implementation of one or more embodiment of the present invention.

FIG. 5 illustrates an embodiment of a terminal 500 on which embodiments of the present invention may be implemented. Terminal 500 is typically part of a central business unit (CBU) apparatus and includes a printer component 520 along with a pushbutton (or other actuator element) 510 by which a user may signal a response by actuating the pushbutton. Terminal 500 may also include elements such as one or more processors, memory, I/O devices, ROM or other programmable memory, software or firmware, displays, audio indicators and the like (not shown). In accordance with FIG. 5, an alert may be sent to a predefined agent of the business entity (e.g., a manager) when the actuator element 510 is not actuated within a given time period. This alert enables the predefined agent to diagnose why the actuator element 510 has not been actuated.

Figure 11:
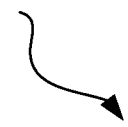
FIG. 11 illustrates a printout of a receipt.

Printer component 520 may be used to provide a printed output in response to a request for a service received via text message, such as, for example, a request for a takeout order at a restaurant. FIG. 11 shows an example of a printout. Alternately, other visual or audible display mechanisms (not shown) may be used in place of, or in addition to printer 520, such as an LCD or other display and/or an audible output through a speaker or other sound generation mechanism.

Figure 6:
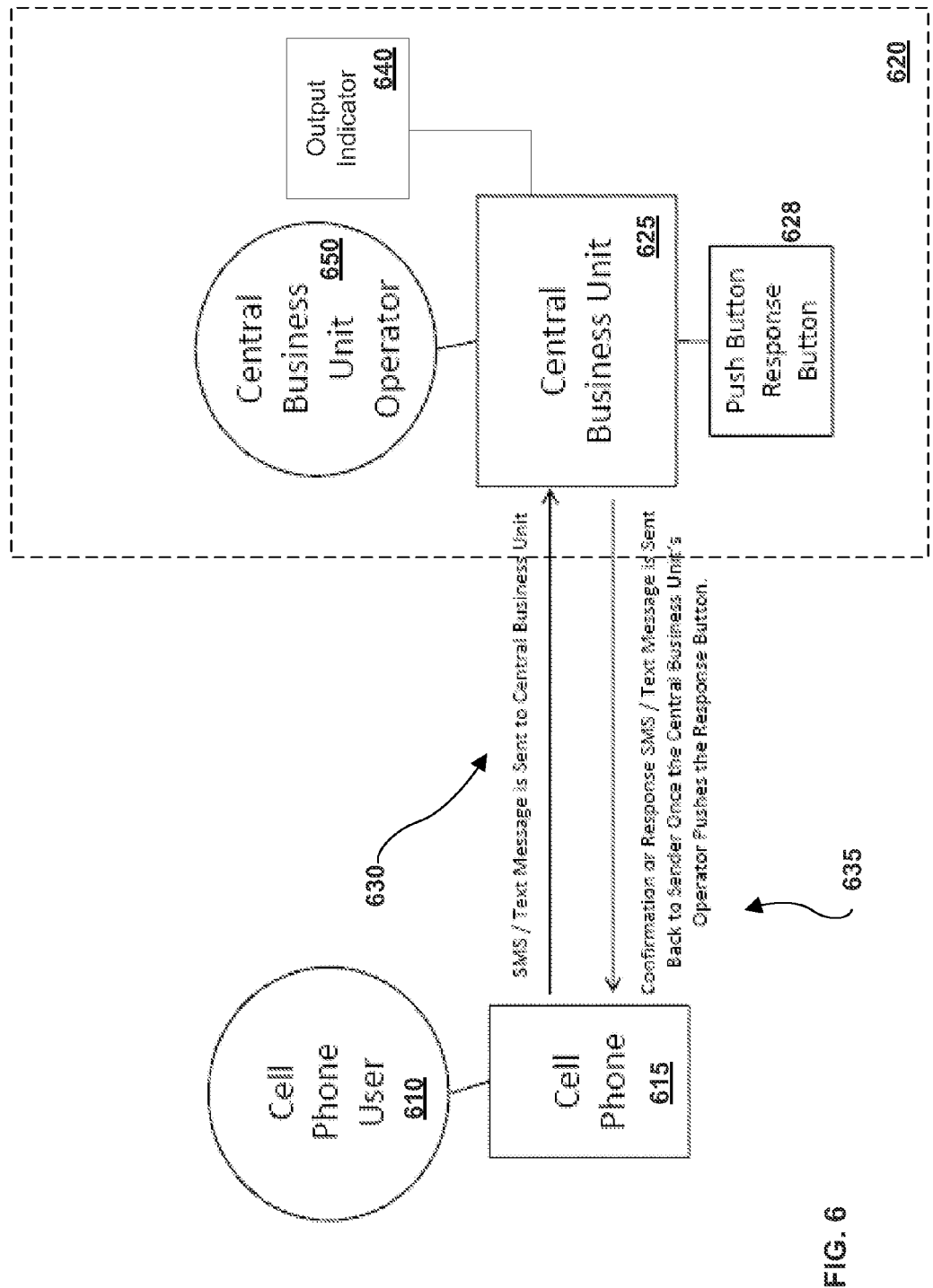
FIG. 6 illustrates an embodiment of a system and associated workflow in accordance with aspects of the present invention.

FIG. 6 illustrates an embodiment of a workflow and associated apparatus for a pushbutton response system using a terminal such as is shown in FIG. 5. As shown in FIG. 6, a cell phone user 610 may first initiate a contact with a service provider (central business unit) 620. The user 610 sends, via a cell phone, PDA, or other apparatus 615 capable of generating a message 630, such as an SMS or text message, the message to a central business unit receiving apparatus 625. A unit operator 650 (such as a restaurant operator, waiter, etc.) associated with the service provider is provided with a response button, such as pushbutton 628 (which may correspond with button 510 of terminal 500 as shown in FIG. 5), to initiate transmission of a confirmation or acknowledgment message 635 to the original sender 610 via cell phone 615. This operation is typically done in response to an output indication provided to the unit operator 650 (such as via a buzzer, light, etc.). The unit operator 650 may further be presented with the content of the original SMS message 630, such as, for example, on printer element 520 (as shown in FIG. 5) and/or on another audible or visual display element (not shown), typically after actuating the response button. The confirmation message will typically be generated to respond to the user's request of a product or service and will acknowledge receipt at the service provider (CBC). For example, if the original message 630 is an order for a product or service, the confirmation message 635 may include content such as "Your text message has been received and will be processed—Thank you for your order."

Figure 7A:
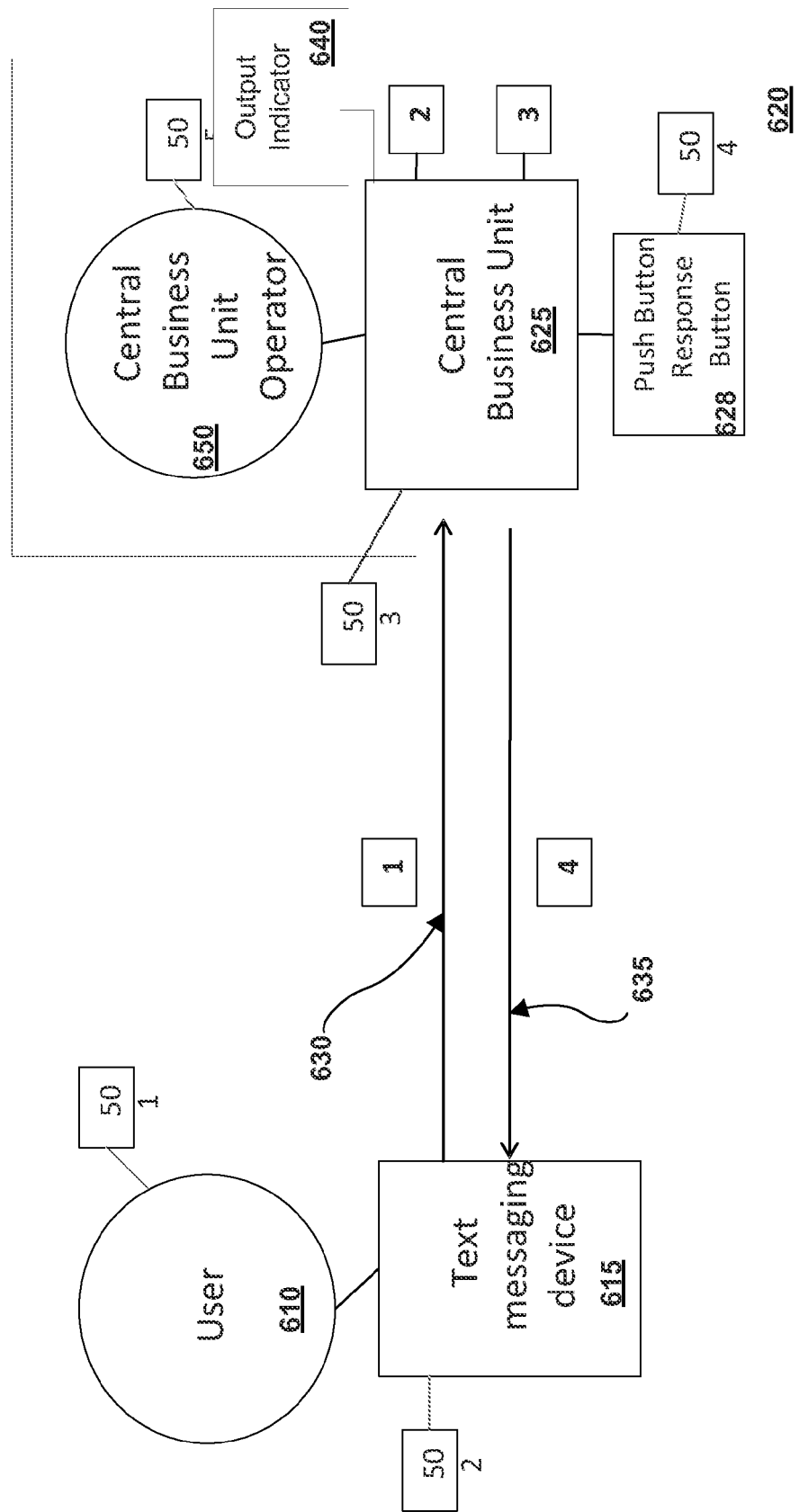
FIG. 7 illustrates another embodiment of a system and associated workflow in accordance with aspects of the present invention.
Figure 7B:
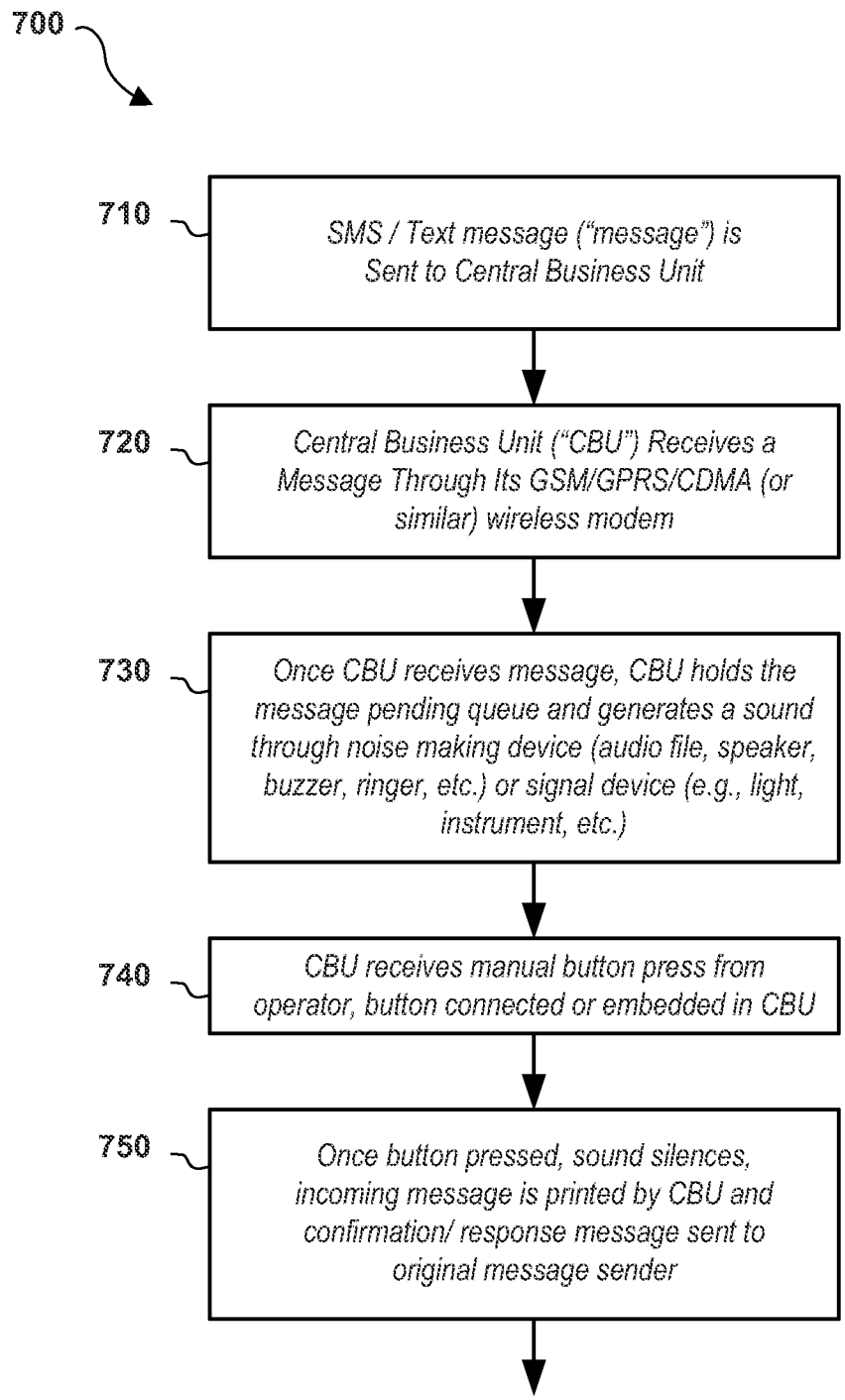

FIG. 7 illustrates additional details of one embodiment of a workflow on a system such as is shown in FIG. 6. At stage 1, the user 610 sends the message 630 to the central business unit apparatus ("CBU") 625. Apparatus 625 includes a modem, such as, for example, a GSM, GPRS and/or CDMA wireless modem, as well as processors, memory, I/O device, etc. (not shown). Once the CBU 625 receives the message 630, the CBU 625 stores the message in a pending queue in memory and generates an indication of an incoming message to the operator 650 on an output indicator 640. This may be done with, for example, a sound mechanism such as a buzzer or speaker which may provide a buzz or other alarm sound, rendered audio file, ringer, and the like. Alternately and/or in addition, a visual signaling device, such as a light or flasher, LED, LCD display and the like, may be used as the output indicator to provide further visual indication of incoming message receipt. The message content and associated audible or visual indicator will typically be maintained at least until the operator 650 responds via the pushbutton 628, with pushbutton 628 typically connected to or embedded in the CBU 625; however, the output may be terminated in a timeout loop if it exceeds a certain duration.

At stage 4 the operator 650 acknowledges receipt of the incoming message in response to the output indicator 640 by actuating pushbutton 626, with the audible and/or visual output (i.e., buzzer, light, etc.) of the output indicator 640 then terminated. In addition, the operator 650 may be presented with the message content such as on a printer 520, visual display, audible output or other rendering mechanism. Once the pushbutton 628 has been actuated, the CBU apparatus 625 generates sends a confirmation/response message 625 back to the original message sender 610.

The CBU 625 may include a queue or other memory or database configuration to buffer incoming messages and store them in a response queue until the message is acknowledged by the operator 650. This may be particularly advantageous in implementations where large number of incoming messages are received and the operator or operators 650 are unable to answer them at the rate that the messages are received.

Once the pushbutton 628 has been actuated, the CBU 625 extracts the incoming text message or messages' phone number(s) and converts them to a recipient number, to which the confirmation/acknowledgment message 635 can be sent. Embedded memory and one or more functional modules in CBU 625 then generate the confirmation message 635 and send it to the original sender 610. In typical embodiments, the confirmation message 635 is not sent until the operator 650 has manually actuated the pushbutton response. This may provide advantages over other systems that implement an automatic SMS (or other text) response.

Figure 8A:
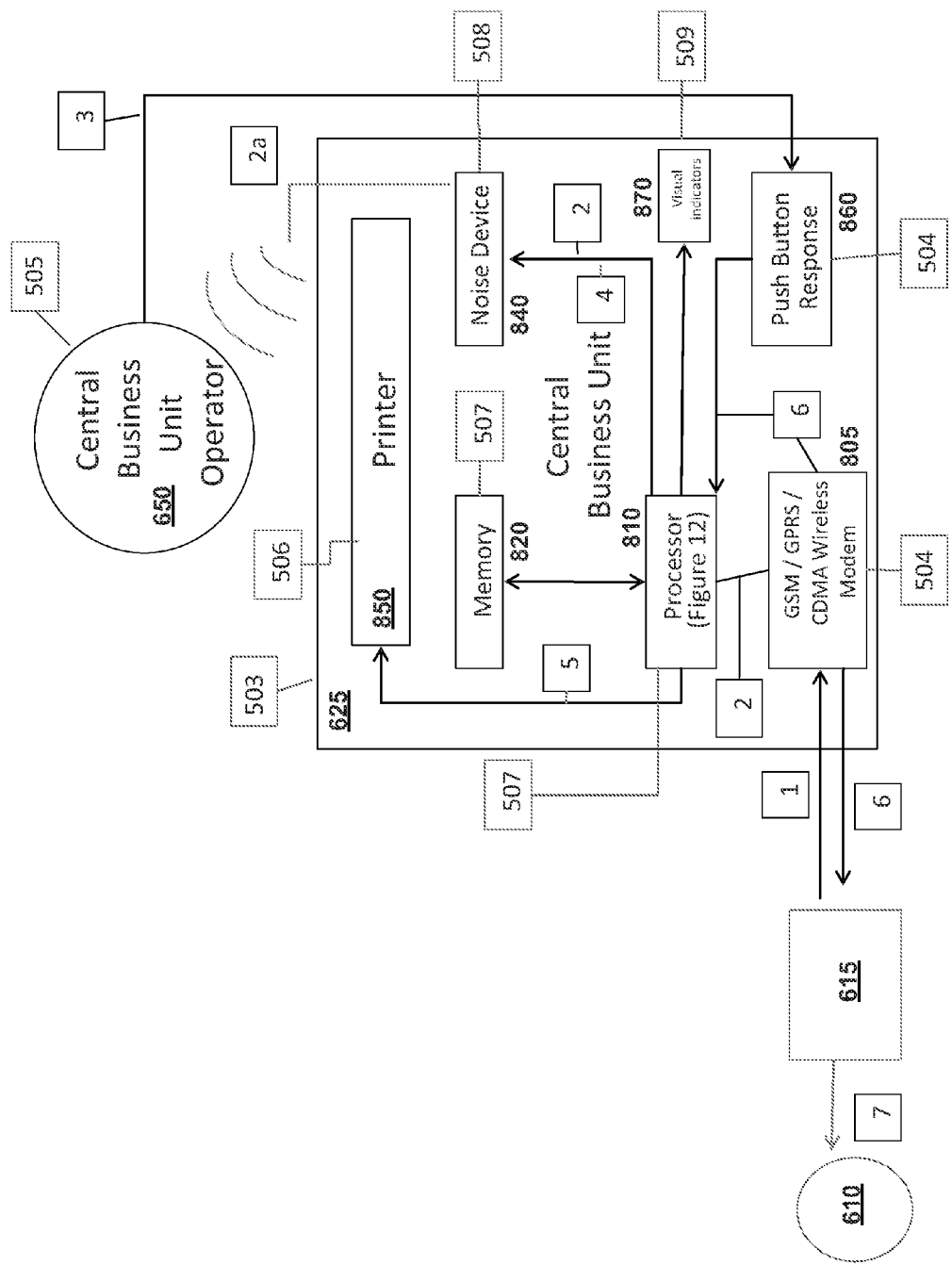
FIG. 8 illustrates an embodiment of a central business unit (CBU) apparatus in accordance with aspects of the present invention.
Figure 8B:
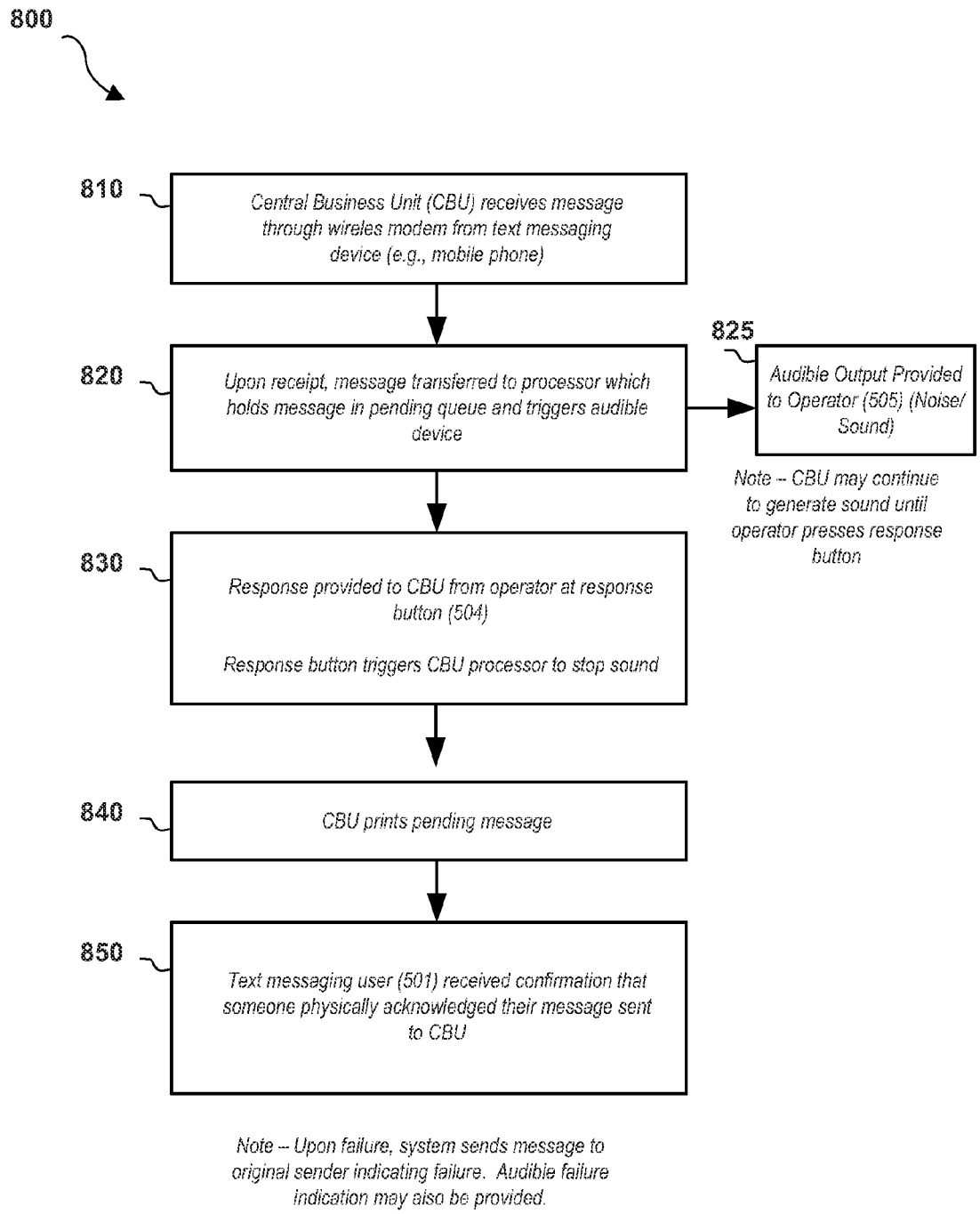

FIG. 8 provides additional details of an embodiment of a central business unit apparatus 625 as shown in FIGS. 6 and 7. CBU 625 receives an incoming text message 630 through a modem 805 (such as a GSM/GPRS/CDMA or similar device) or other communications apparatus. After receipt, the message 630 is transferred to a processor 810 and associated memory 820 coupled to the processor, with the message content stored in a receipt queue in the CBU 625. In addition, an output indicator device 840 (light, buzzer, etc., typically corresponding to output indicator 640) is triggered to alert the operator 650 of receipt of an incoming message 630. The incoming message may be assigned a pending status upon receipt, with the pending status associated with the message until the operator actuates the pushbutton response mechanism 860. Pushbutton 860 typically corresponds with pushbutton 628 of FIGS. 6 and 7.

In response to the output of message indicator 840 (such as upon hearing the buzzer or seeing an indicator light) the operator 650 actuates pushbutton 860 to indicate acknowledgement of the incoming message. In response to the operator's actuation, a signal is sent from pushbutton apparatus 860 to processor 810 which then signals the output indicator device 840 to stop its output. Actuation of pushbutton 860 may also trigger the processor 810 to initiate printing or displaying of the pending message, such as on printer 850 (typically corresponding to printer 520). For example, printer 850 may be provided with the message content and may then print it on an output tape, strip, paper, etc. Alternately or in addition, other output mechanisms, such as displays, audible outputs, or other outputs (not shown) may be used to render the message content. In addition, actuation of pushbutton 860 may also trigger the processor 810 to initiate generation of the confirmation/acknowledgement message 635 and transmission of the message to the sender 610 of the original message 630.

As also shown in FIG. 8, if there is a failure, such as the message not being acknowledged within a predetermined response time, malfunction with the CBU, printer, or other failure mechanism, the system may provide a response to the original message sender 610. For example, the system may send a message to the sender 610 in response to a failure indicating that the message was not received or is unable to be processed at the current time. In addition, the message may provide additional information on the failure and/or options to resend the request or otherwise respond to the failure. In addition, the system may be configured to provide an audible and/or visual alarm in response to the failure and/or or provide other failure related information, such as a display of failures and status, associated messages send to the sender 610, failure logging, responses to the failure message and/or other responses either visually, audibly, via logged information or in a combination of these mechanisms.

Figure 9A:
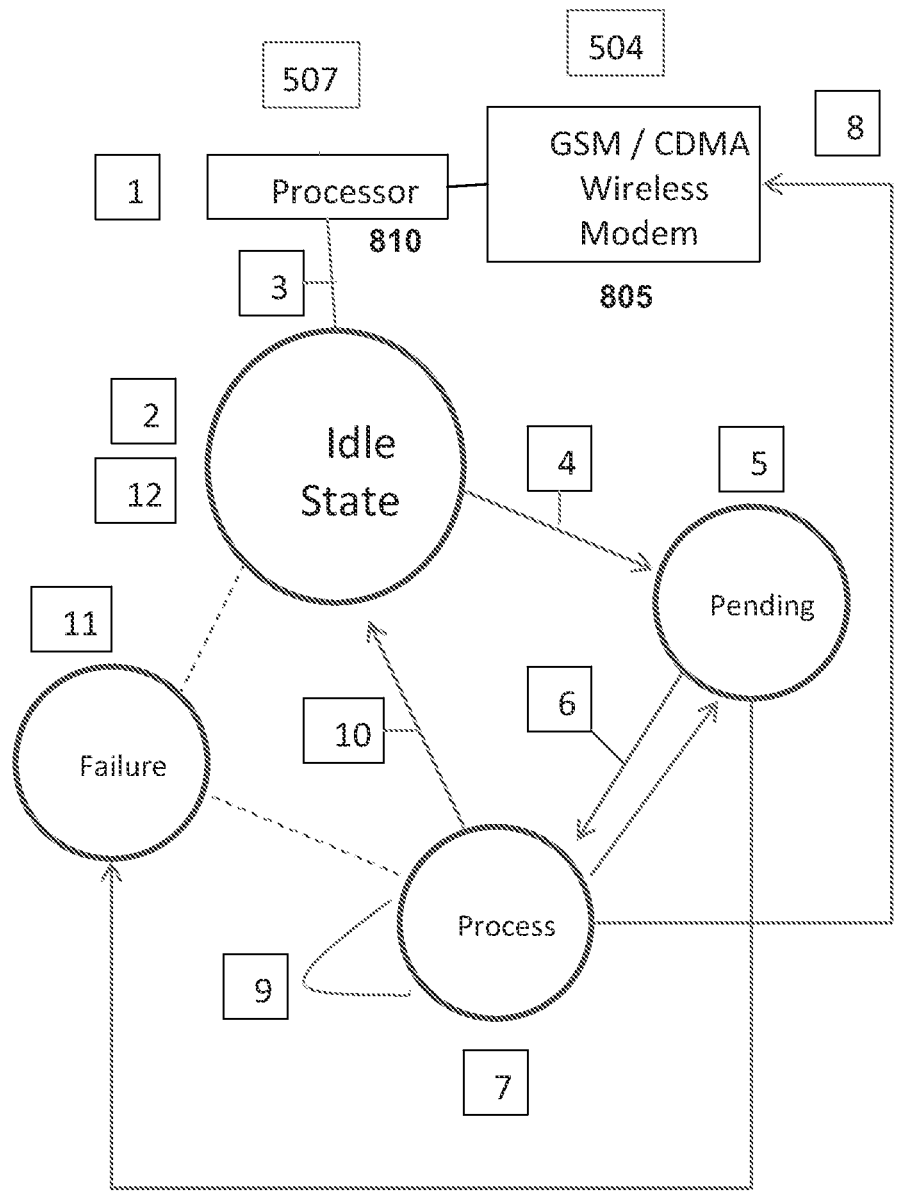
FIG. 9 illustrates an embodiment of a processor flow in accordance with aspects of the present invention.
Figure 9B:
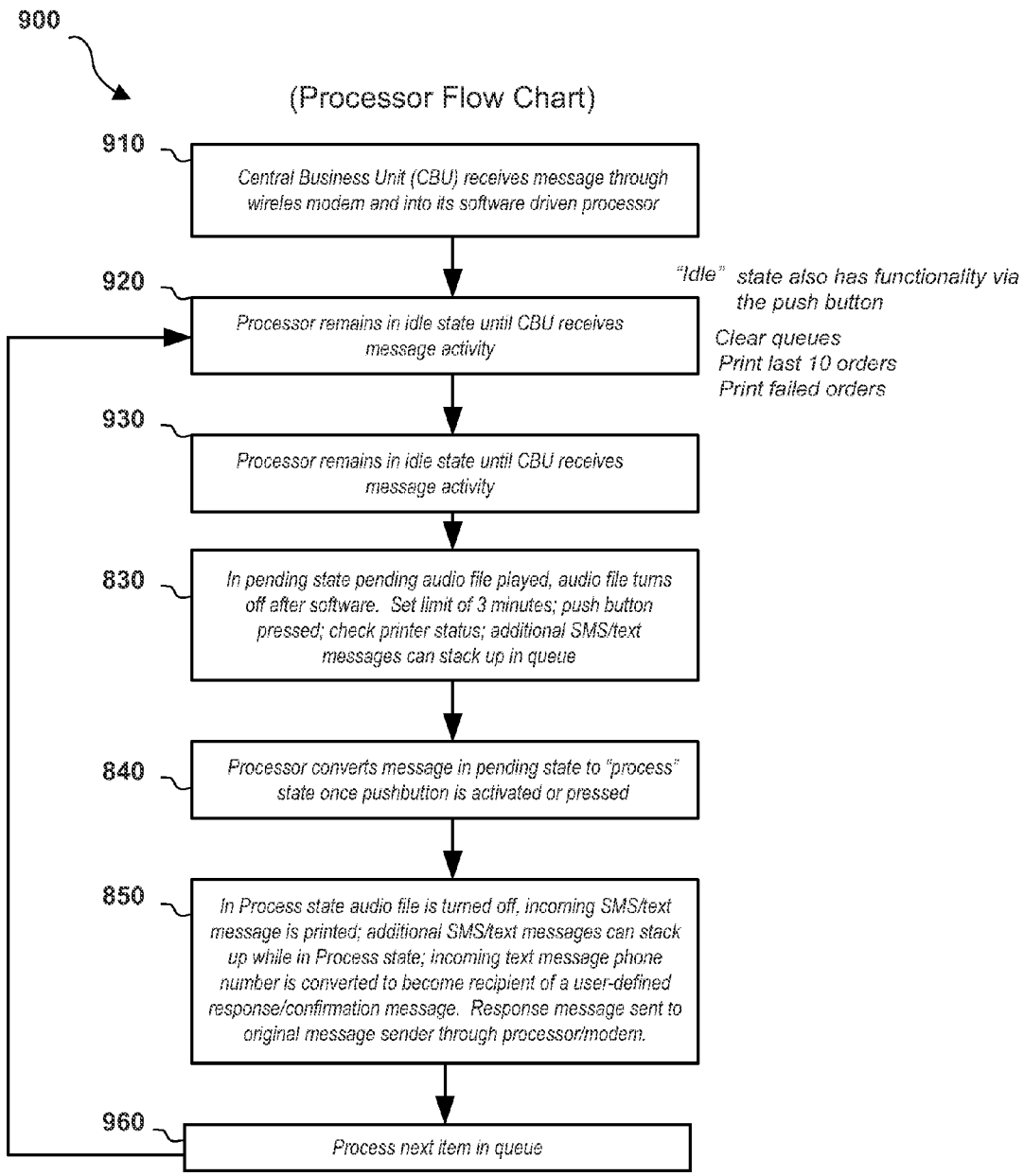

FIG. 9 illustrates details of an embodiment of a process workflow for a processor such as processor 810 as shown in FIG. 8. At stages 1-3, processor 810 maintains an idle state (with respect to message processing) until a message 630 is received from modem 805. The processor 810 then stores the incoming message and associates a "pending" state to the message. During the pending state, an output indicator, such as a buzzer, light, etc., may be provided to alert an operator 650 to receipt of the incoming message. In some embodiments, a timeout may be implemented to limit the duration of the output. Multiple incoming messages may be stacked in an incoming message queue in the pending state. Upon actuation of a pushbutton, such as pushbuttons 628, 860, a process state may be associated with the incoming message. In this state, the output may be turned off and the incoming message printed or otherwise rendered to the operator 650. In addition, the incoming message phone number may be extracted and a confirmation message generated and sent to the original message sender 610. Processor 810 may then return to an idle state to await receipt of the next message and/or may execute other processing functions. In some embodiments, in the idle state additional functionality may be provided such as 1) a clear queue function to allow an operator 650 to clear pending queues. For example, in a typical embodiment in the idle state either no messages have yet been received or all pending messages have been acknowledged. In this state it may still be desirable to retrieve information regarding previously received and/or processed transactions. For example, in one embodiments if the pushbutton 860 is held down for a predefined time period (such as, for example, 10 seconds) one or more old messages or previously processed messages (such as, for example, a predefined number of messages, such as 10 messages or a user defined number of messages) may be retrieved. Other features may also be provided, such as printing of a specified number of previous requests/orders received as incoming text messages, and/or a list of failed orders may also be printed or displayed.

In addition, a failure state may be provided. In this state, a generic failure SMS response may be generated and sent. Failure in this context may represent any of a number of system or operator failures. These may include failure of an operator to actuate the pushbutton, a system failure, such as a CBU or printer failure (out of ink, out of paper, other printer malfunction, etc.) or other system failure (such as, for example, failure of circuitry, voltage values, mechanical apparatus failures, network or connectivity issues (GSM/GPRS network registration issues, modem reception issues, etc.) and the like.

Figure 10:
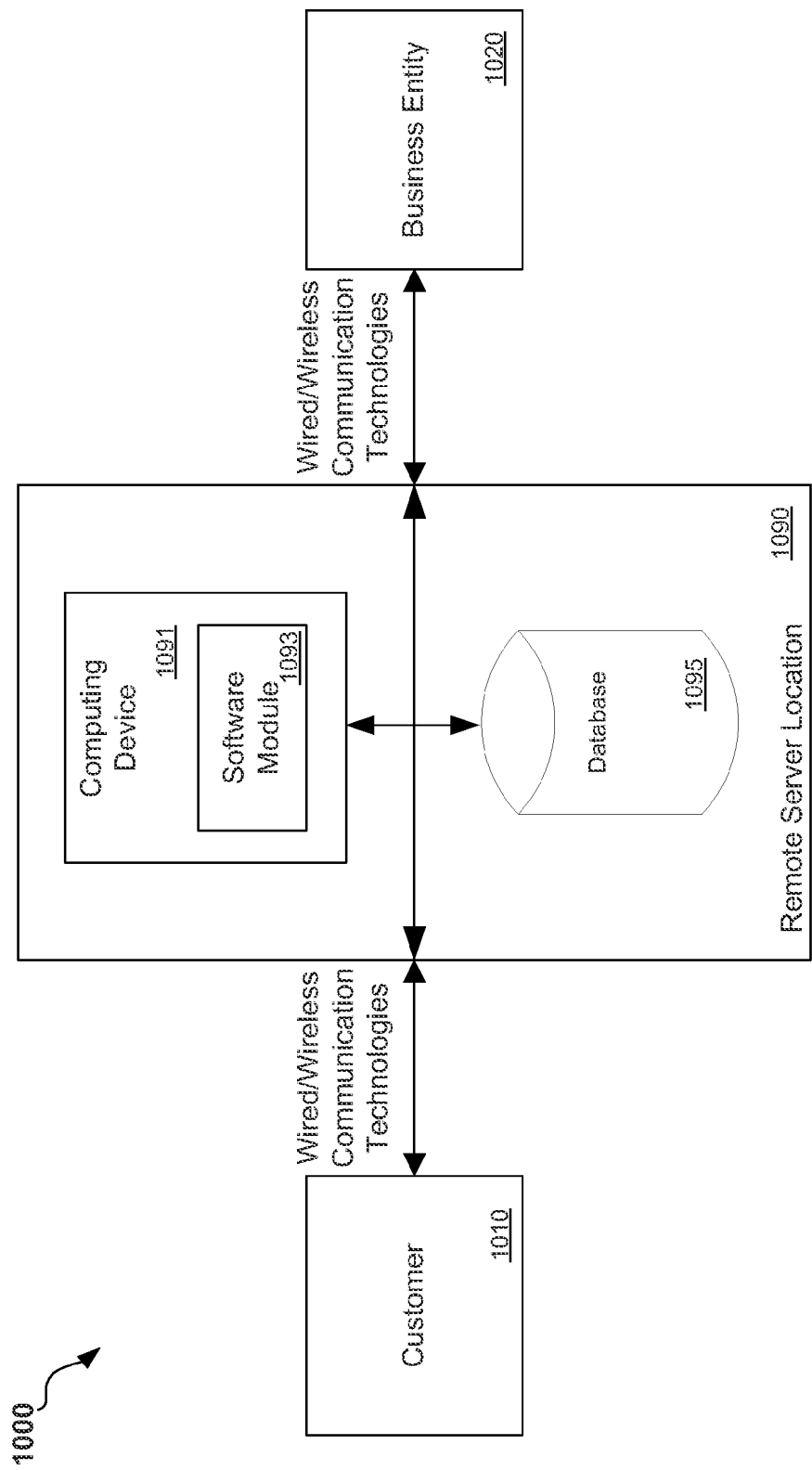
FIG. 10 illustrates an embodiment of a system in accordance with aspects of the present invention.

FIG. 10 describes one embodiment where a remote server location 1090 sends and receives information to and from a customer 1010 and a business entity 1020, which both operate a computing device (e.g., a handheld device, a computer) (not shown). The remote server location 1090 includes a computing device 1091 capable of running software 1093. The remote server location 1090 also includes a database 1095 capable of storing information related to the customer 1010 (e.g., customer profile information, payment information, favorites, data indicating behavioral trends in relation to transactions, data indicating historical transactions) and the business entity 1020 (e.g., data indicating services offered, data indicating locations, coupons/discounts/promotional information).

The remote server location 1090 may send electronic information (e.g., a list of services, a menu, a list of locations, coupons, information related to real estate) to the customer 1010 after receiving a request from the customer 1010 for that information, or in response to a different type of transaction between the customer 1010 and a business entity 1020 (e.g., an order for goods, a request, a notification) or in response to other criteria (e.g., a recognized location of the customer's 1010 device using location-based recognition techniques).

The remote server location 1090 is capable of receiving electronic information (e.g., a list of services, a menu, a list of locations, coupons) from the business entity 1020. The remote server location 1090 may use that electronic information to update similar information stored in a database on behalf of that business entity 1020. The remote server location 1090 may also present all or a portion of that information to the customer 1010.

The remote server location may also be configured to collect data and perform data mining operations in relation to collected data. In some embodiments, information is collected on a per transaction basis. Such information may be stored with reference to a phone number, IP address, central business unit location, user device location, time of day, and other reference information useful for various statistical operations.

One of skill in the art will appreciate that the functionality described above in relation to the remote server location 1090 can be performed by alternative computing environments, including those at particular business entities.

Additional embodiments pertain to systems and methods involving a programmable central business unit. In some embodiments, a business entity (e.g., an employee, an employer, a manager) operates a computing device (e.g., a handheld device, computer) to send programming instructions to the central business unit via a communication pathway (e.g., wireless telephone network including a browser and/or SMS messages and/or voice-recognition commands, wired and wireless Internet networks including a Web portal, other communication pathways capable of transmitting signals usable for programming a the central business unit). The programming instructions include instructions that define various aspects of the central business unit's operation. In one instance, the instructions may dictate how a printer prints a message. In another instance, the instruction s may dictate whether and/or how the central business unit acknowledges the receipt of electronic information from a remote device (e.g., a customer operating a handheld device or personal computer).

Figure 12A:
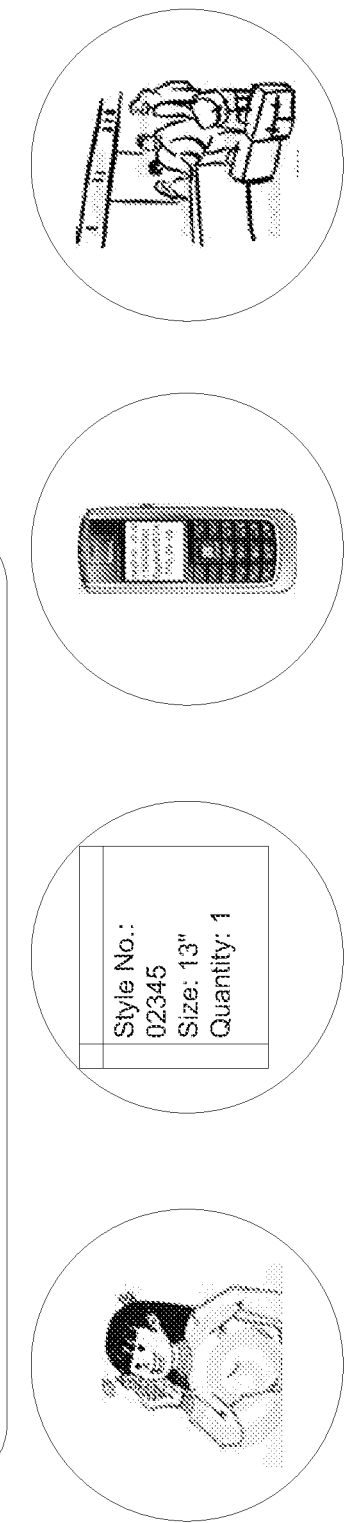
Figure 16:
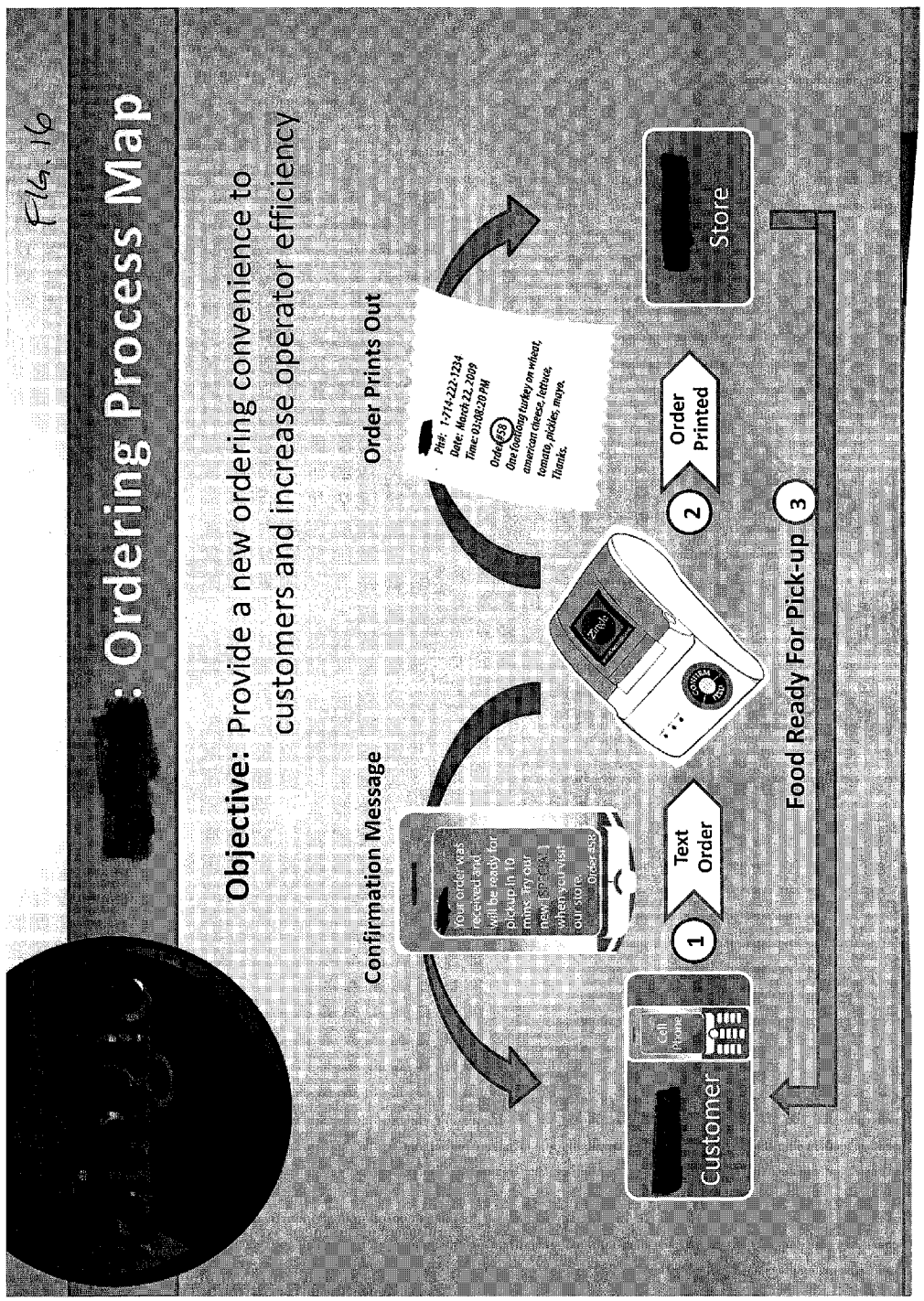
Figure 17:
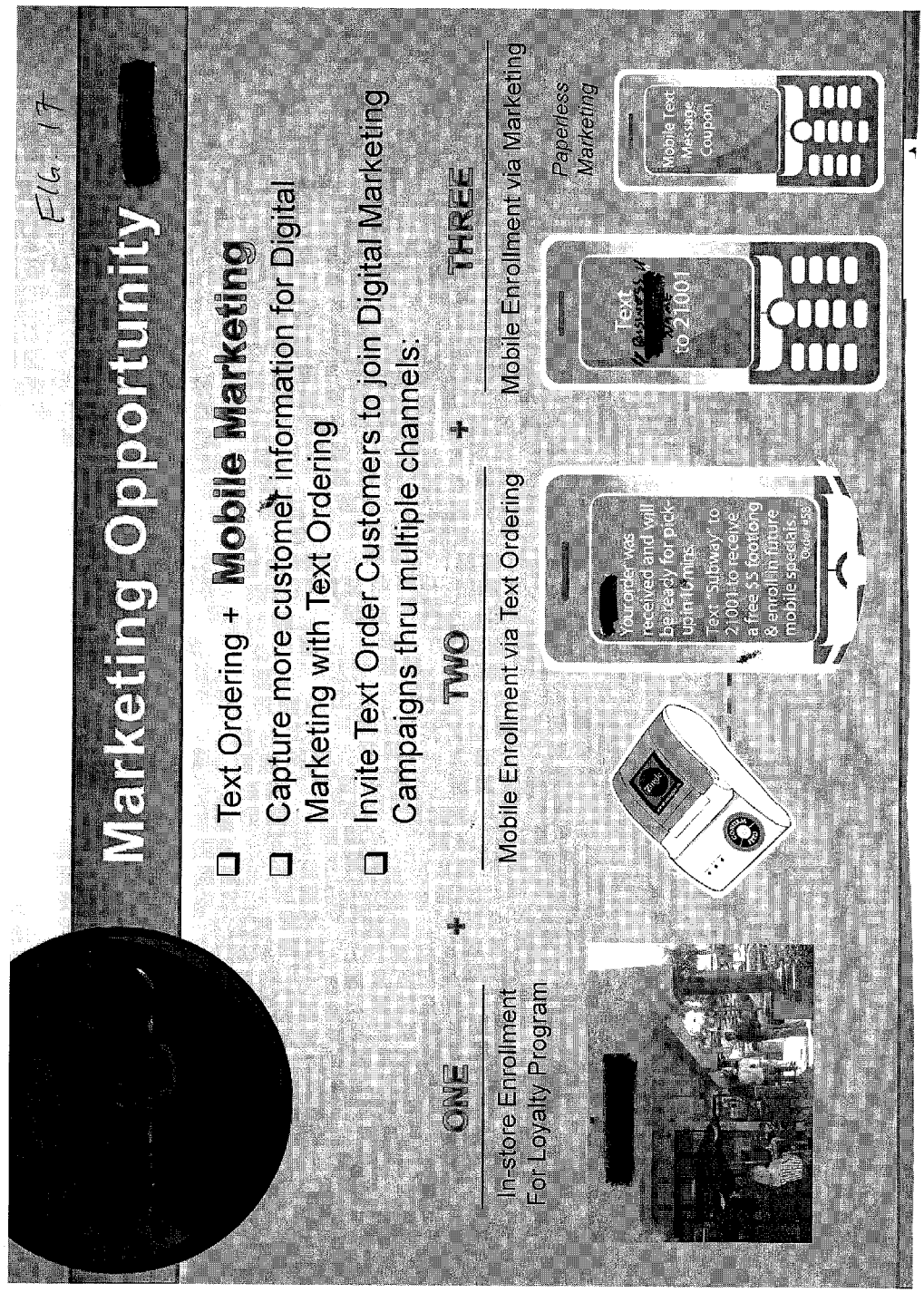

Certain embodiments pertain to methods. FIGS. 12A and 12B each illustrate aspects of such business methods. Additional methods are illustrated in FIGS. 13-17. In accordance with FIG. 13, at least on embodiment of the present invention provides a system and method for allowing a business entity to program its central business unit 1325 using any of several different communication devices 1315 (e.g., multiple phones, computers, etc.). As shown in FIG. 13, a business entity (e.g., an agent of the business entity) can change or customize a programmable feature within the central business unit 1325 by sending a text message 1390. The text message 1390 includes a 'pin' 1391 and 'command word' 1393 that are both associated with the central business unit's unique text phone number or IP address. (E.g., the text phone number can either be a standard ten digit phone number, short code (less than 10 digits) or an IP address). The test message 1390 also includes additional information 1395. The process of sending the pin 1391 (in the case of FIG. 13, a 4-digit pin) followed by the command word 1393 allows authorized agents of the business to reprogram the central business unit 1325 while allowing non-authorized individuals (e.g., customers) to send their text messages (e.g., to order some commercial item or service) to the central business unit 1325. In accordance with FIG. 13, the 4-digit pin 1391 is used to grant the business entity access to any of several functions that are represented in software capable of running within the central business unit 1325. The command word 1393 instructs the software how to reconfigure the central business unit 1325.

The following examples illustrate how the pin 1391, command word 1393 and additional information 1395 in the text message 1390 reconfigured a programmable function:

1234 name Joe's Bagels. The four digit pin activates the programming software and tells the business unit to look for the command word. The command word "name" then activates the software to reprogram the name that appears on all printed text messages and the name that is sent back to all customers in the confirmation message.

1234 response Your order will be ready in ten minutes. Thank you for visiting our restaurant. The password activates the command word, "response" which reconfigures the response message all customers receive when they text the business unit.

1234 order 1 The password activates the command word, "order" which looks for "1" or "0". If "1" is entered, the business unit prints an order number on the printed ticket and sends the same order number to the customer in the confirmation message.

1234 password 4321 The password activates the command word, "password" which then changes the future password to "4321".

One of skill in the art will appreciate other command words.

FIG. 14 illustrates a system and method for providing text-based promotions using "Keywords" that triggers a certain response to an original text that contains the keyword. As an example, if a customer 1405 wants to know what the Soups of the day are at a particular restaurant, he/she can send a text message 1415 with the word "Soups" to 858-XXX-XXXX (i.e., the text phone number for a central business unit 1425). The central business unit 1425 recognizes "Soups" and returns a specific message to the customer 1405 that describes the soups of the day. Soups (and other keywords) can be reconfigured from a cell phone as well:

1234 soups "Today we have chicken tortilla soup, lobster bisque and lentil soup. Have a great day!" The password activates the command word "Soups" which tells the software to store the following message into memory. Then anytime a customer starts their text with Soups (no password), the custom soup response message is sent back to the customer. Other keywords included, specials, beers, wine, music, happy hour, events, etc.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms.

It is noted that in various embodiments the present invention may relate to processes such as are described or illustrated herein. These processes are typically implemented in one or more modules comprising systems as described herein, and such modules may include computer software stored on a computer readable medium including instructions configured to be executed by one or more processors. It is further noted that, while the processes described and illustrated herein may include particular steps or stages, it is apparent that other processes including fewer, more, or different stages than those described and shown are also within the spirit and scope of the present invention. Accordingly, the processes shown herein are provided for purposes of illustration, not limitation.

As noted, some embodiments of the present invention may include computer software and/or computer hardware/software combinations configured to implement one or more processes or functions associated with the present invention such as those described herein. These embodiments may be in the form of modules implementing functionality in software and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler, and files containing higher-level code that are executed by a computer using an interpreter. Computer code may be comprised of one or more modules executing a particular process or processes to provide useful results, and the modules may communicate with one another via means known in the art. For example, some embodiments of the invention may be implemented using assembly language, Java, C, C#, C++, or other programming languages and software development tools as are known in the art. Other embodiments of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method for processing electronic information at a terminal, the method comprising:
   receiving, at a processor of the terminal, at least a portion of a first message sent from a wireless device associated with a first user wherein the first message is an SMS message;
   storing, in a receipt queue memory coupled to the processor, the first message;
   actuating, in response to the receipt of the first message, an output indicator of the terminal;
   receiving, in response to the output indicator, an operator input;
   sending, in response to the receiving an operator input and from the terminal, second message to the wireless device;
   printing, at a printer coupled to the processor and in response to the operator input, at least a portion of the first message wherein the printing further includes printing additional value-added information and wherein the additional value-added information includes at least one of a date and time stamp.

2. The method of claim 1, wherein said sending includes extracting, by the processor, a phone number of the wireless device from the first message.

3. The method of claim 1, wherein said output indicator comprises an audible indicator.

4. The method of claim 1, wherein said output indicator comprises a visual indicator.

5. The of claim 1, wherein said operator input is received at a pushbutton.

6. The method of claim 1, wherein said second message is a SMS message that includes a confirmation of receipt of said first message.

7. The method of claim 1, further comprising
   receiving, from a computing device, a programming instruction.

8. The method of claim 7, wherein the programming instruction alters at least one step of the method for processing electronic information.

9. The method of claim 2, further comprising:
   sending information to a remote server location from the terminal, wherein said information includes at least a portion of the first message.

10. The method of claim 1, wherein the receiving, from a wireless device associated with a first user, a first message, comprises:
    receiving, from a remote server location, at least a portion of the first message.

11. The method of claim 1 wherein the additional value-added information includes a phone number of the wireless device.

12. The method of claim 1 wherein the additional value added information includes profile information linked to a phone number of the wireless device.

13. A terminal apparatus for processing electronic information, the terminal apparatus comprising:
    a processing module including a processor and a memory;
    a modem communicatively coupled to the processing module, said modem disposed to receive a first message sent from a wireless device of a first user and provide the first message to the processing module;
    an output indicator module coupled to the processing module, said output indicator module configured to provide an output indication in response to receipt of the first message;
    an input module coupled to the processing module, said input module configured to receive an input from an operator in response to the output indication;
    a printer module coupled to the processing module, said printer module disposed to print, in response to receiving an indication of said input from an operator, at least a portion of the content of the first message and additional value-added information and wherein the additional value-added information includes at least one of a date and time stamp; and
    a machine readable medium coupled to the processing module, said medium including instructions for execution on the processor to:
       initiate providing the output indication on the output indicator module in response to receipt of the first message;
       receive the input from an operator; and
       generate, in response to said receiving the input from an operator, a second message, said second message generated for transmission to the first user from the terminal apparatus.

14. The terminal apparatus of claim 13, wherein said first message is an SMS message, and said second message is an SMS message that includes a confirmation of receipt of said first message.

15. The terminal apparatus of claim 13, wherein said output indicator comprises an audible indicator or a visual indicator, and said operator input is received at a pushbutton.

16. The terminal apparatus of claim 13, wherein said modem is further disposed to receive a third message from a second user, said third message including one or more programming instructions for altering the instructions for execution on the processor.

17. The terminal apparatus of claim 13, further comprising:
an Internet connection disposed to send or receive information to or from a remote server location.

18. The terminal apparatus of claim 13, wherein said medium further includes instructions for execution on the processor to store the first message in a receipt queue of the memory.

19. The terminal apparatus of claim 13, wherein the additional value-added information further includes a phone number of the wireless device.

20. The terminal apparatus of claim 13, wherein the instructions to generate the second message include instructions to extract a phone number of the wireless device from the first message.

21. A non-transitory computer readable medium configured for storing processor executable instructions for processing electronic information at a terminal which, when executed by a processor of the terminal, cause the processor to:

receive, from a wireless device associated with a first user, a first text message;

store the first text message in a receipt queue of a data storage element coupled to the processor;

actuate, in response to the receipt of the first message, an output indicator of the terminal;

receive, in response to the output indicator, an operator input;

initiate transmission of a second text message from the terminal to the first user; and print, at a printer coupled to the processor and in response to the operator input, at least a portion of the first text message and additional value-added information and wherein the additional value-added information includes at least one of a date and time stamp.

22. The non-transitory computer readable medium of claim 21, further configured for storing processor executable instructions for causing the processor to:

send or receive information to or from a remote server location.

23. The non-transitory computer readable medium of claim 21, wherein the first text message includes a pin, command word and additional information, and wherein the computer readable medium is further configured for storing additional processor executable instructions for causing the processor to alter the executable instructions based on the first text message.

* * * * *